3,718,825
SWEEP CIRCUIT EXHIBITING ELIMINATED JITTER
Hideo Matsuoka, Tokyo, Japan, assignor to Iwatsu Electric Co., Ltd., Tokyo, Japan
Filed Dec. 17, 1970, Ser. No. 99,208
Claims priority, application Japan, Dec. 27, 1969, 45/1,065, 45/1,066
Int. Cl. H03k 4/10
U.S. Cl. 307—228                           14 Claims

ABSTRACT OF THE DISCLOSURE

A sweep circuit wherein a signal is derived at the end of the hold-off signal and gated with the synchronising pulses (or signals derived therefrom) to provide an output pulse which automatically adjusts the timing of the end of the hold-off signal, thereby to eliminate jitter automatically.

FIELD OF THE INVENTION

This invention relates to an improved sweep circuit which automatically eliminates jitter, relative to synchronising pulses which control the sweep circuit, thereby enabling visible jitter to be eleminated in signal observation apparatus such as an oscilloscope.

It is a well known fact that in signal observation apparatus such as an oscilloscope, jitter in a horizontal direction of the waveform to be observed, frequently occurs. The sweep circuit of an oscilloscope generally comprises a synchronising pulse generator, a gate circuit responsive to the output of the synchronising pulse generator and a hold-off circuit, a sweep signal generator triggered by the signal from gate circuit. The hold-off circuit establishes a hold-off interval at the end of the signal generated by the sweep signal generator. The gate circuit triggers the sweep generator in response to the first synchronising pulse occurring after the hold-off signal. Even if a synchronising pulse is applied to the gate circuit within the flyback time of the sweep signal, the hold-off signal keeps the gate circuit closed.

As will be clearly explained later, if a synchronising pulse still exists at the end of the hold-off signal, jitter occurs in the sweep signal, because the start of the sweep signal is not synchronised with the rising edge of the synchronising pulse but occurs at an arbitrary time within the duration of this pulse. When this jitter is large, observation of a repetitive waveform with which the synchronising pulses are synchronous will become impossible while when it is small it may cause an observational error. It has been the practise to adjust the end time of the hold-off signal by hand to eliminate, the jitter but this operation is complicated and, moreover, it takes a comparatively long time to make the adjustment.

SUMMARY AND OBJECTS OF THE INVENTION

The object of this invention is to provide a circuit which will eliminate jitter automatically, rapidly and simply.

According to the present invention, there is provided a sweep circuit comprising a synchronising pulse generator, a gating circuit jointly responsive to this pulse generator and to a hold-off circuit to trigger a sweep signal generator in response to the first synchronising pulse occurring at the end of a hold-off signal generated by the hold-off circuit, the hold-off circuit being arranged to operate in timed relation to the sweep signal to provide a hold-off signal which ends after flyback of the sweep signal, first means arranged to provide an output pulse when a synchronising pulse is present simultaneously with the end of a hold-off signal, and second means responsive to an output pulse from the first means to alter the duration of the interval between the instant at which the sweep signal is triggered and the instant at which the hold-off signal ends.

The invention will be described in more detail by way of example with reference to the accompanying drawings, wherein:

DETAILED DESCRIPTION OF THE ILLUSTRATED EMBODIMENTS

Figure 1:
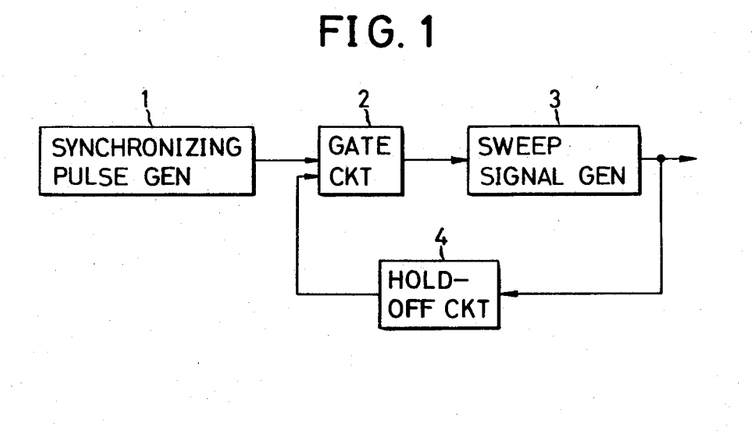
FIG. 1 is a block diagram of a sweep circuit as practised in the prior art.

The sweep circuit of an oscilloscope as practiced in prior art is shown in FIG. 1 and comprises a synchronising pulse generator 1, a gate circuit 2 which is enabled by means of two signals derived respectively from the synchronising pulse generator 1 and a hold-off circuit 4, and a sweep signal generator 3 which is triggered by means of signals from the gate circuit 2. The hold-off circuit 4 generates a hold-off signal of predetermined duration when it is triggered by the sweep signal generator 3.

Figure 2:
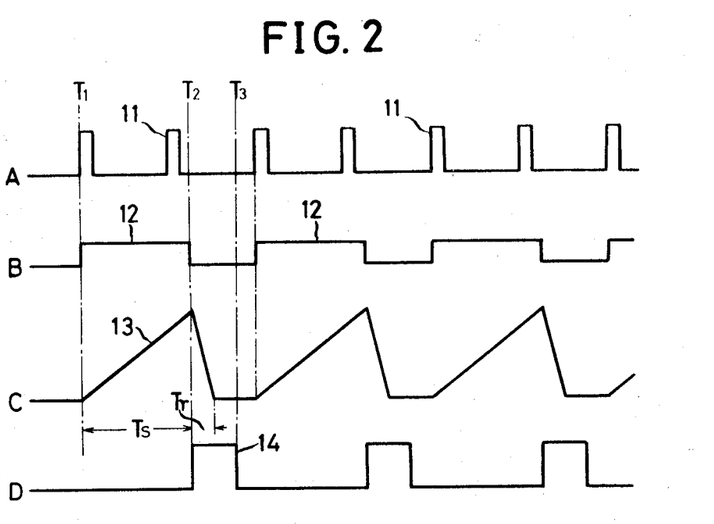
FIGS. 2A–2D are signal waveforms obtained at various points in the sweep circuit shown in FIG. 1.

The synchronising pulse generator 1 generates synchronising pulses 11 as shown in FIG. 2A and these pulses are applied to the gate circuit 2. The gate circuit 2 generates a gate signal 12 as shown in FIG. 2B, since the gate circuit 2 opens in response to the synchronising pulse 11 generated at time $T_1$ and closes in response to the hold-off signal 14 (FIG. 2D) generated at time $T_2$.

As shown in FIG. 2C the sweep signal generator 3 generates a sweep signal 13. Thus, the generator 3, upon the opening of the gate circuit 2 at time $T_1$, ramps up linearly and then triggers the hold-off circuit 4 on reaching a given voltage level, i.e. at time $T_2$, and also executes flyback at this time. As the result, this sweep signal generator 3 generates sawtooth sweep signals 13 having sweep time $T_s$ and flyback time $T_r$.

The hold-off signal 14 (FIG. 2D) is also triggered when the sweep signal 13 reaches the said given level at $T_2$. The hold-off signal 14 is arranged to last longer than the flyback time $T_r$ of the sweep signal 13. As the result, even if a synchronising pulse 11 is applied to the gate circuit 2 within the flyback time $T_r$, the gate circuit 2 is held closed. The hold-off signal 14 is sometimes called an inhibit signal.

The sweep signal 13, after being amplified by a horizontal amplifier, is applied to the horizontal deflecting plates of a cathode ray tube.

Because each synchronising pulse 11 has a finite width there will be occasions when the end of the hold-off signal 14 falls within the time of a synchronising pulse 11. In this case, jitter occurs.

Figure 3:
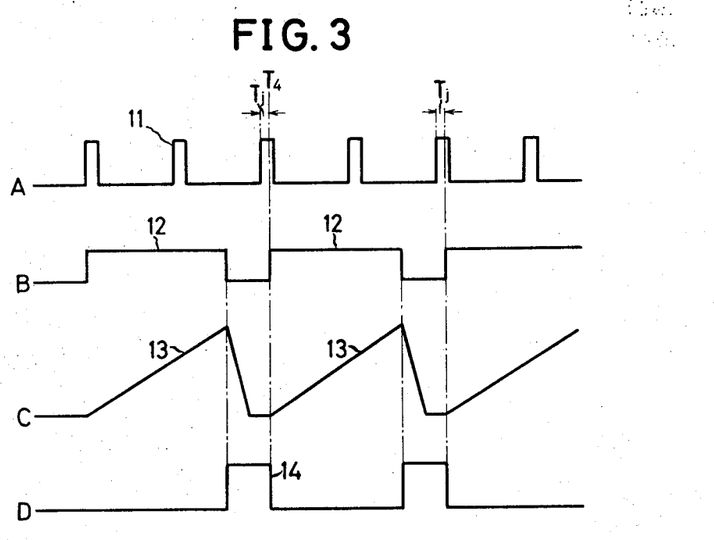
FIGS. 3A–3D are signal waveforms obtained at various points in the sweep circuit when jitter is generated in the circuit shown in FIG. 1.

Generation of jitter will be described with reference to FIGS. 3A–3D. Assuming that he hold-off signal 14 ends at time $T_4$, the gate circuit 2 will no longer be inhibited. Therefore, the gate circuit 2 is opened by the synchronising pulse 11 existing on time $T_4$. When the gate circuit 2 opens, the sweep signal 13 of the second sawtooth wave as shown in FIG. 3C commences. When the first sweep signal 13 is compared with the second sweep signal 13, it will be seen that the second sweep signal 13 does not commence at the start of a synchronising pulse 11. Thus the second sweep signal 13 starts later by time $T_j$ than the synchronising pulse 11 and this time $T_j$, or time lag, causes jitter. That is to say, the horizontal sweep timing shifts relative to a recurrent waveform which is being displayed and which is synchronous with the pulses 11. Therefore the observed waveform moves or jitters in the horizontal direction. If this jitter is large, observation will become impossible and if it is small it may bring about an observational error.

It has been a conventional method that, when jitter is seen generating, the duration of the hold-off signal 14 is adjusted by the operator to eliminate the jitter. This gets complicated and takes a fair length of time.

The first embodiment of apparatus for controlling the sweep circuit in accordance with this invention will be described with reference to FIGS. 4–8.

The sweep circuit (FIG. 4) is provided as in the case of sweep circuit in FIG. 1, with a synchronising pulse generator 1, a gate circuit 2, a sweep signal generator 3 and a hold-off circuit 4. Additionally this sweep circuit is provided with a differentiating circuit 5 to detect the end of the hold-off signal by differentiating the falling edge of the hold-off signal, an AND circuit 6 responsive to the differentiated pulse generated at the end of the hold-off signal and a synchronising pulse from the pulse generator 1, and a control voltage generating circuit 7 generating a predetermined voltage in response to the output of the AND circuit 6.

The differentiating circuit 5 generates a differentiated pulse 15 as shown in FIG. 5E off the falling edge of the hold-off signal 14. The differentiated pulse that is obtained at the rising edge of the hold-off signal 14 is blocked by a diode and is shown as an insignificant pip in the waveform.

The AND circuit 6 is a circuit generating on an output pulse 16 (FIG. 5F) only when a synchronising pulse 11 and a differentiated pulse 15 exist at the same time. If the synchronising pulse 11 and the differentiated pulse 15 exist at time $T_4$, the output pulse 16 is generated. This is the situation in which jitter $T_j$ has occurred.

The output pulse 16 is applied to the control voltage generating circuit 7 which generates the control voltage signal 17 as shown in FIG. 5G. This control voltage signal 17 is applied to the hold-off circuit 4.

When the control voltage signal 17 is applied to the hold-off circuit 4, the pulse width of the hold-off signal 14 is increased. The variation of time interval of the hold-off signal 14 is caused by the variation of charge or discharge condition of the hold-off capacitor of the hold-off circuit by means of control voltage signal 17. This state is shown at the second and third hold-off signals 14 in FIG. 5D. If the hold-off signal 14 were not controlled by the control voltage signal 17, the hold-off signal 14 would take the form of wave 14A as indicated by dotted line and, for this reason, jitter would occur again. But, in this embodiment, as the pulse width of the hold-off signal 14 is increased by a time $dt$ by the control voltage signal 17, the synchronising pulse 11 does not exist at the end of the hold-off signal 14 and the jitter disappears.

To increase the pulse width of the hold-off signal 14 by the time $dt$ changes the total of the sweep time and pulse duration of the hold-off signal. Namely, between the total $T_{s1}+T_{h1}$ of sweep time $T_{s1}$ of the first sweep signal 13 and the pulse duration $T_{h1}$ of the first hold-off signal, and the total $T_{s2}+T_{h2}$ of the sweep time $T_{s2}$ of the second sweep signal 13 and the pulse duration $T_{h2}$ of second hold-off signal, there exists a relation $$T_{s1}+T_{h1}+dt=T_{s2}+T_{h2}$$

By means of such control of the sweep circuit, it is possible to eliminate jitter automatically and promptly. In this embodiment, the hold-off circuit 4 is controlled by the control voltage signal 17 so as to prolong the duration of the hold-off signal 14, but, it is also possible to shorten the duration of the hold-off signal 14.

A concrete example of the circuits newly added in FIG. 4 will be described with reference to FIG. 6. The differentiating circuit 5 consists of a series capacitor 23 followed by a shunt resistor 25. This circuit 5 may have other forms. For example, as shown in FIG. 7, a capacitor 89 and a resistor 91 are connected to the output of a transistor 83 having an emitter load 85 and a collector load 87.

The line 21 (FIG. 6) connected to the capacitor 23 has the hold-off signal 14 applied thereto.

The AND circuit 6 has a resistor 27 connected to the differentiating circuit 5 and a diode 29 connected in series with the resistor 27, and a resistor 33 connected to a line 31 and a diode 35 connected in series with the resistor 33. The AND circuit 6 forms a logical product circuit. The line 31 is connected to the synchronising pulse generator 1 to receive the synchronising pulses 11.

The diodes 29 and 35 are connected to tunnel diode 37 shunted by a resistor 41 and an inductor 43. A bias voltage is established via a resistor 39. The diodes 29 and 35 are further connected to a PNP type transistor 45 having an emitter circuit provided with a resistor 47 and a capacitor 49 and a collector resistor 51.

When a differentiated pulse 15 a synchronising pulse 11 are applied to the AND circuit 6 at the same time, the tunnel diode 37 is suddenly switched to the high voltage zone from the low voltage zone, whereby driving current flows out of the base of transistor 45. The transistor 45 turns on and generates the output pulse 16 as shown in FIG. 5F. The inductor 43 and resistor 41 connected in parallel with the tunnel diode 37 prolongs the duration of the output pulse 16.

The control voltage generating circuit 7 is provided with 3 flip-flop circuits 55, 57 and 59 connected as a binary counter. These flip-flop circuits consist of capacitors 61 and 63, resistors 65 and 67 and NAND circuits 69 and 71. The flip-flop circuits 55, 57 and 59 have output resistors 73, 75 and 77 whose values are in the ratios 4:2:1. These 3 resistors 73, 75 and 77 are connected commonly to the output line 81 and to ground through a resistor 79 whose value is less than that of any of the resistors 73, 75 and 77. The line 81 is connected to the hold-off circuit 4 shown in FIG. 4. Namely, line 81 is so connected that the time interval of the hold-off signal 14 can be changed by changing charge or discharge condition of the hold-off capacitor of the hold-off circuit 4.

If an output pulse 16 shown in FIG. 5F, is applied to the flip-flop circuit 55 of the control voltage generating circuit 7, the flip-flop circuit 55 will switch to "on" from "off," whereby the control voltage signal 17 is generated through resistor 73. As the result, the pulse width of the hold-off signal 14 changes.

Explanation has been so far confined to the case in which the output pulse 16 is generated only once, viz the case where jitter was eliminated by one adjustment. However the jitter may not be eliminated by one adjustment of the pulse width of the hold-off signal 14.

Figure 8:
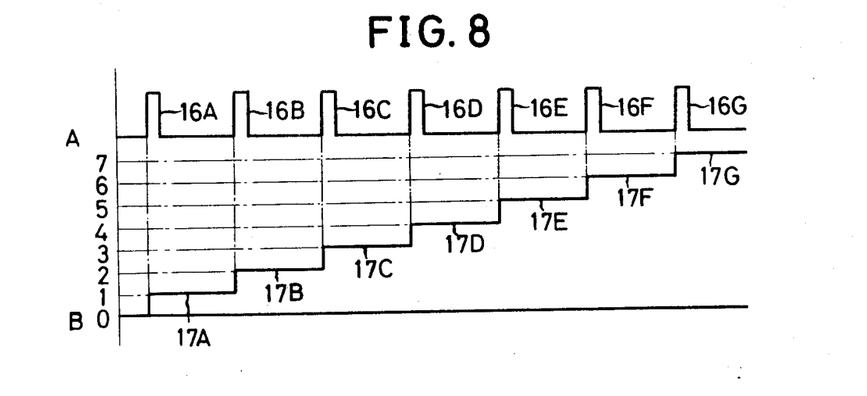
FIGS. 8A and 8B are waveforms illustrating pulses generated by the circuit shown in FIG. 6.

In this case, as shown in FIG. 8, more output pulses such as 16B, 16C, 16D, 16E, 16F and 16G will be generated in succession, until the jitter is eliminated. In accordance with these output pulses 16A–16G, the level of control voltage signals 17A, 17B, 17C, 17E, 17F and 17G is progressively stepped up and as a result the pulse width of the hold-off signal 14 is progressively increased until jitter is eliminated.

Figure 6:
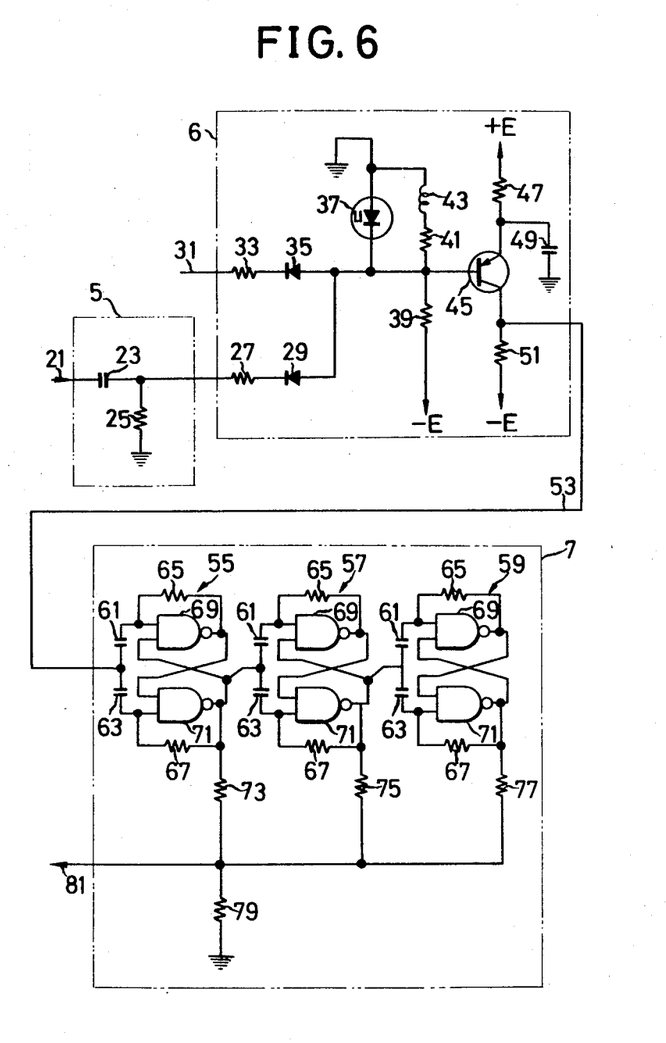
FIG. 6 is a circuit diagram of a differentiating circuit, an AND circuit and a control voltage generating circuit included in the sweep circuit shown in FIG. 4.
Figures 7, 13:
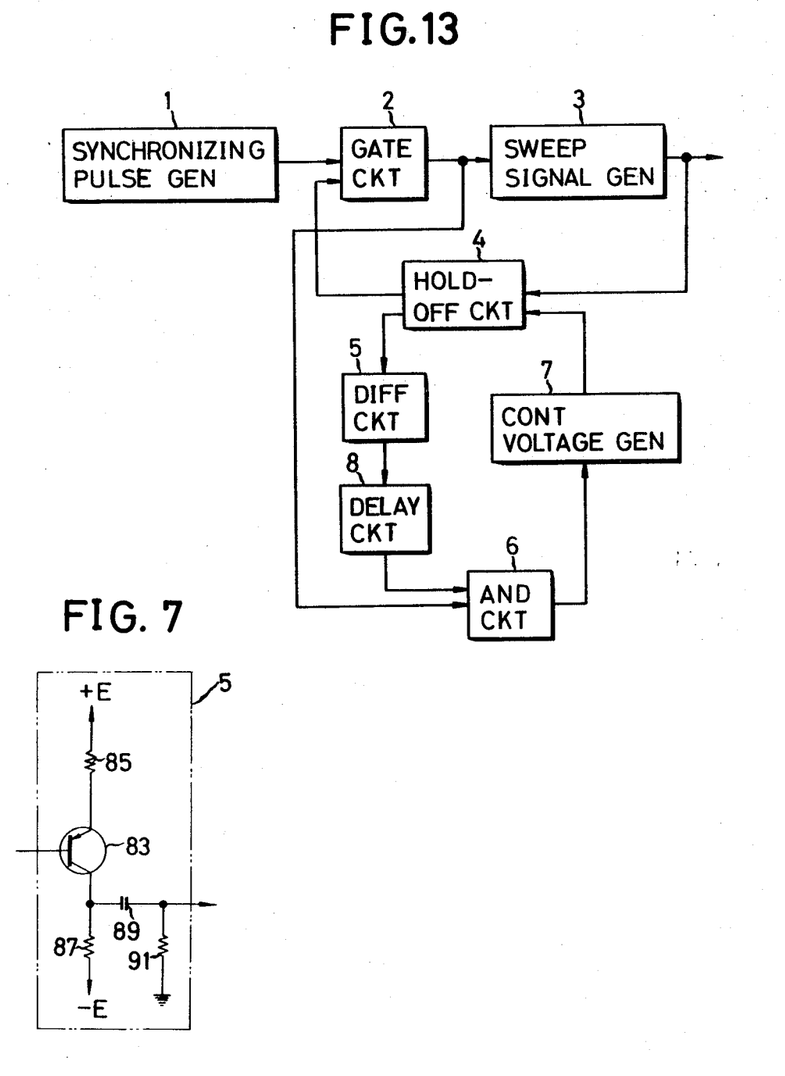
FIG. 7 is a circuit diagram of another differentiating circuit.
FIG. 13 is a block diagram of another further embodiment of sweep circuit in accordance with this invention.

When the first output pulse 16A is applied to the control voltage generating circuit 7 shown in FIG. 6, the flip-flop 55 will be switched "on" the flip-flops 57 and 59 remain "off." As a result, as shown in FIG. 8B, the first control voltage signal 17A is generated frim the resistor 73 of the flip-flop 55. The voltage of the first control voltage signal 17A will be arbitrarily referred to as 1.

When the second output pulse 16B is applied to the control voltage generating circuit 7, the flip-flop circuit 55 will be switched "off" and the flip-flop 57 will be switched "on" (the flip-flop 59 remaining "off"). Because of the stated ratios of resistance values, a control voltage signal 17B having the voltage value 2 is generated by the resistor 75.

When the third output pulse 16C is applied to the circuit 7, the flip-flop 55 will be switched "on" and the resistors 73 and 75 generates a control voltage 17C having the voltage value 3.

When the fourth output pulse 16D arrives, the flip-flops 55 and 56 will be switched "off" and the flip-flop 59 will be switched "on." A control voltage signal 17D having the voltage value 4 is generated by the resistor 77.

In this way, successive output pulses 16A, 16B, 16C, 16D, 16E, 16F and 16G cause the control voltage signals of seven levels 17A, 17B, 17C, 17D, 17E, 17F and 17G to be generated. When a higher voltage is needed, the number of flip-flops can be increased.

In consequence of the gradual increase of the voltage level of the control voltage signal 7, the pulse width of the hold-off signal 14 increases progressively and the total of the sweep time $T_h$ of the hold-off signal 14, viz $T_s+T_h$, gets larger. Ultimately the synchronising pulse 11 and the end of the hold-off signal 14 do not exist at the same time and the jitter disappears.

Figure 9:
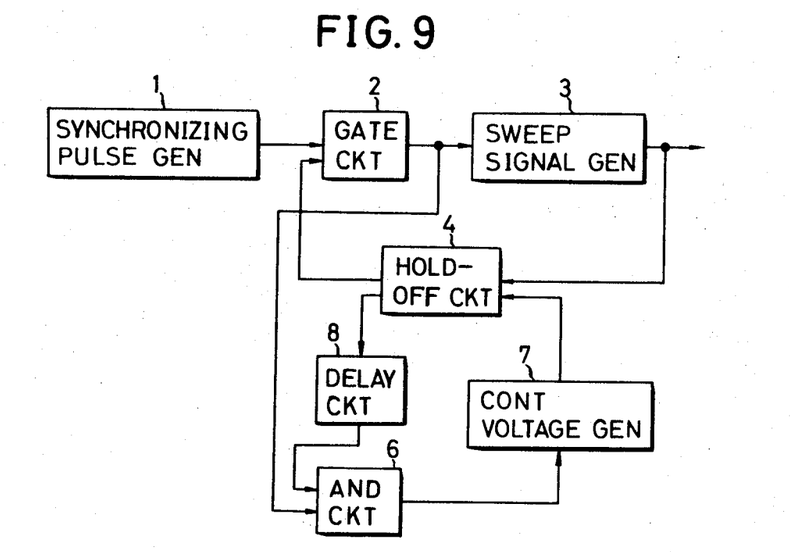
FIG. 9 is a block diagram of still another embodiment of sweep circuit in accordance with this invention.

The block diagram in FIG. 9 shows another apparatus embodying the invention. This circuit differs from that of FIG. 4 in that a delay circuit 8 replaces the differentiating circuit 5 to delay the hold-off signal 14 by a predetermined time $T_d$, thus forming a delayed signal 18 (FIG. 10E) which forms one input to the AND circuit 6. The AND circuit 6 shown in FIG. 9 is further connected to the output of the gate circuit 2 (instead of to the output of the synchronising pulse generator 1).

Referring to FIGS. 10A–10G, the AND circuit 6 generates an output pulse 16 only when the delayed signal 18 and the gate signal 12 are present at the same time. Assuming that, at the end $T_4$ of the hold-off signal 14, the synchronising pulse 11 exists, jitter exists. In this state, the gate signal 12 and the delayed signal 18 also exist at the same time so that it is possible to obtain an output pulse 16 from the AND circuit 6. When jitter is not occurring the gate signal 12 disappears simultaneously with the end of the hold-off signal 14. The gate signal 12 recurs on the rising edge of the next synchronising pulse 11. Therefore, the gate signal 12 and the delayed signal 18 do not exist at the same time and no output pulse 16 is generated.

Figure 4:
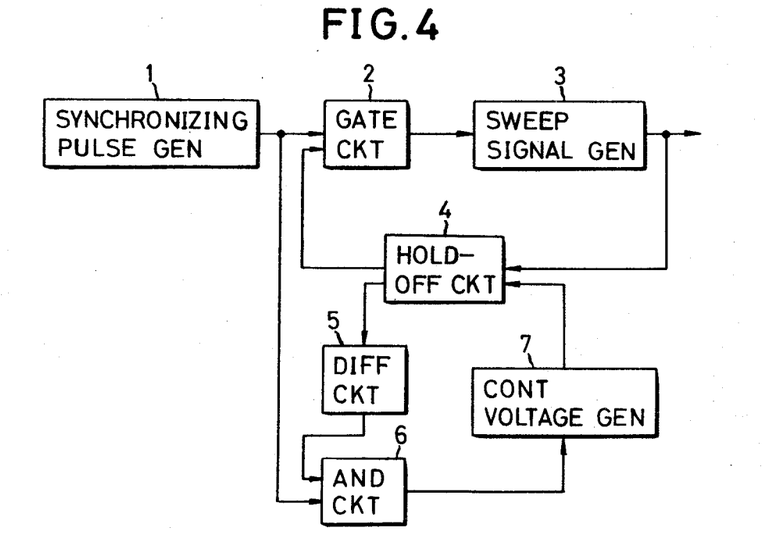
FIG. 4 is a block diagram of one embodiment of a sweep circuit in accordance with this invention.
Figure 5:
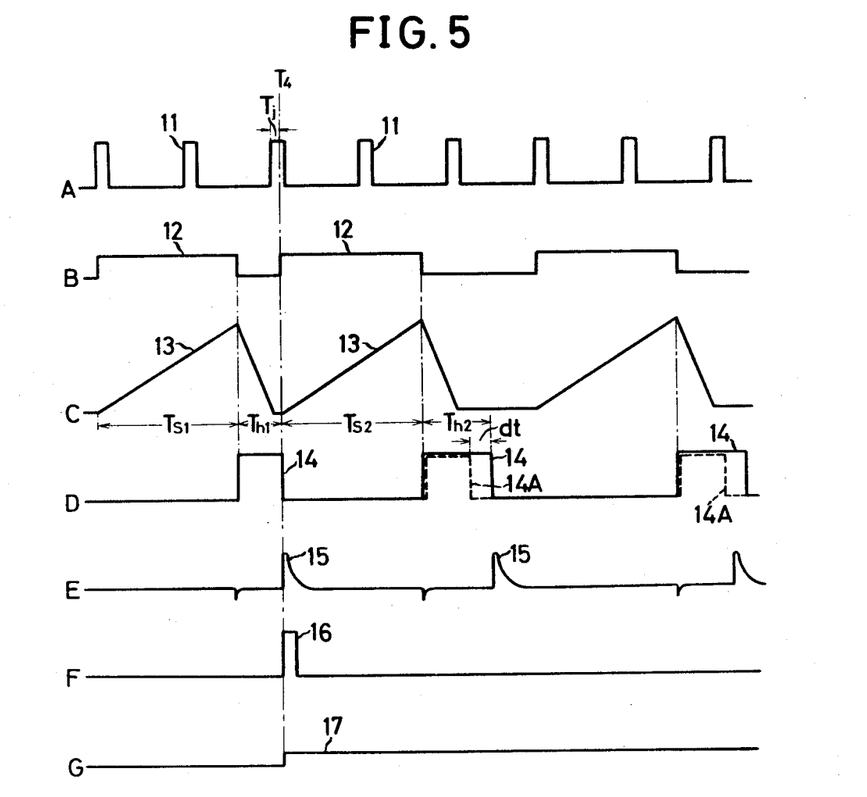
FIGS. 5A–5G are signal waveforms obtained at various points in the sweep circuit shown in FIG. 4.
Figure 10:
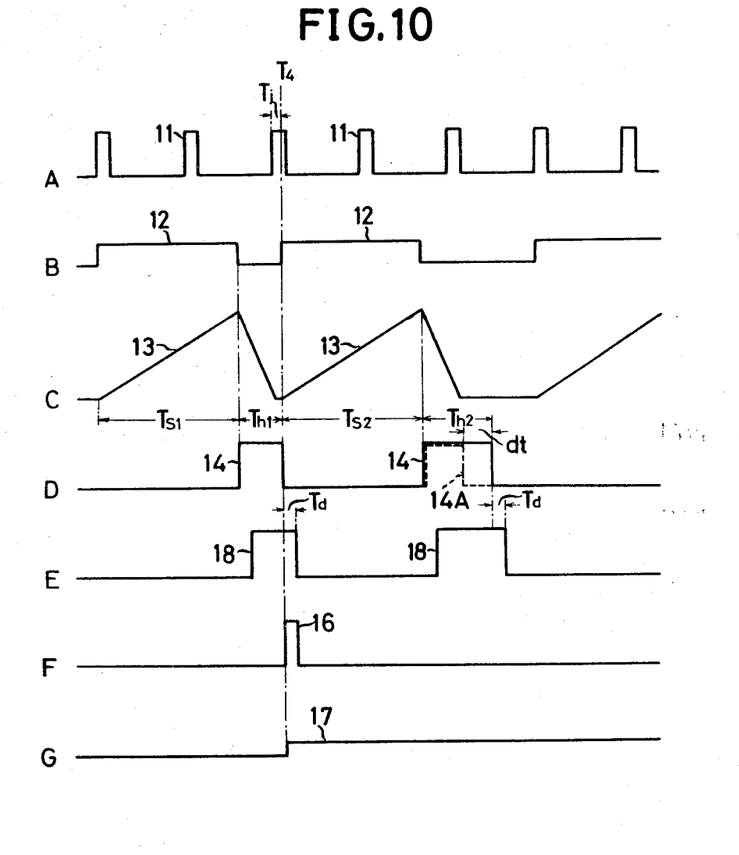
FIGS. 10A–10G are waveforms obtained at various points in the sweep circuit shown in FIG. 9.

The action of the output pulse 16 shown in FIG. 10F is as described in the case of FIG. 4.

Figure 11:
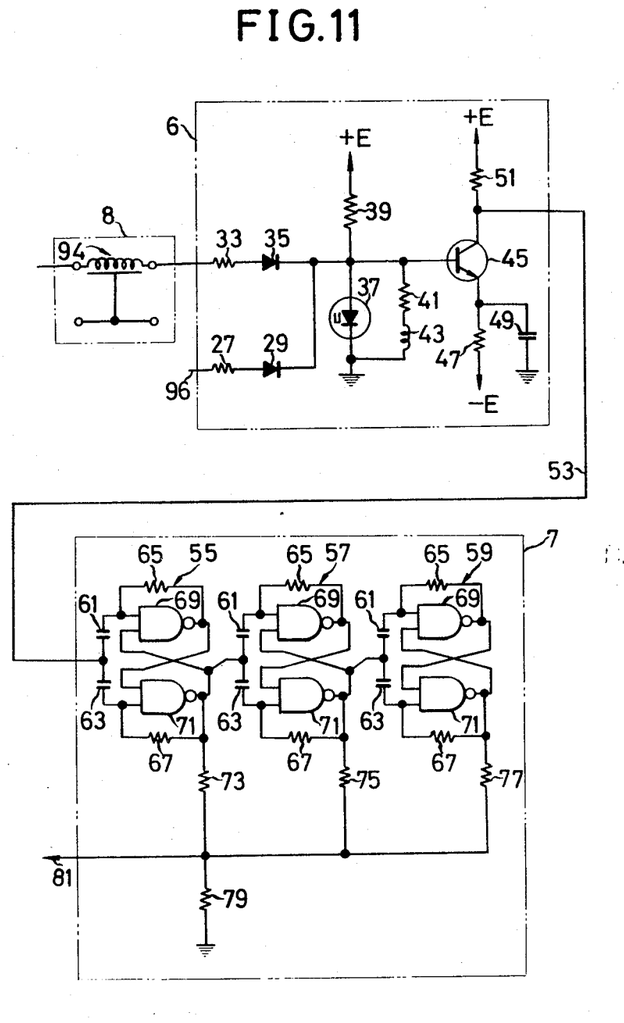
FIG. 11 is a circuit diagram of a delay circuit, differentiating circuit and control voltage generating circuit included in the sweep circuit shown in FIG. 9.

A concrete example of the circuit in this embodiment will be described with reference to FIG. 11. The delay circuit 8 is formed by a delay line 94 which delays the hold-off signal 14 supplied on line 21 by a very short time $T_d$. Line 96 is connected to the output terminal of the gate circuit 2, the gate signal 12 being thus fed to line 96.

The AND circuit 6 and control voltage generating circuit 7 are the same, except that they are of the opposite polarity, as the circuits shown in FIG. 6.

Figure 12:
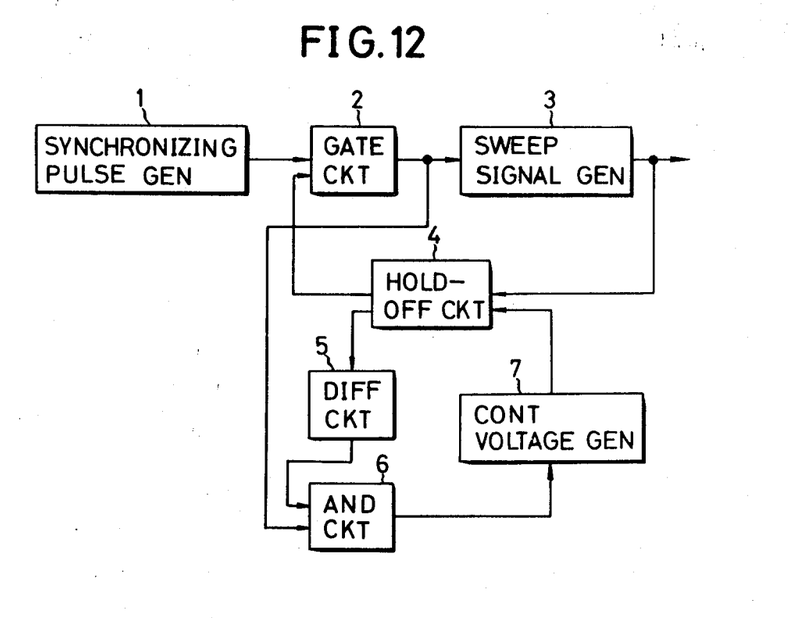
FIG. 12 is a block diagram of a further embodiment of sweep circuit in accordance with this invention.
Figure 14:
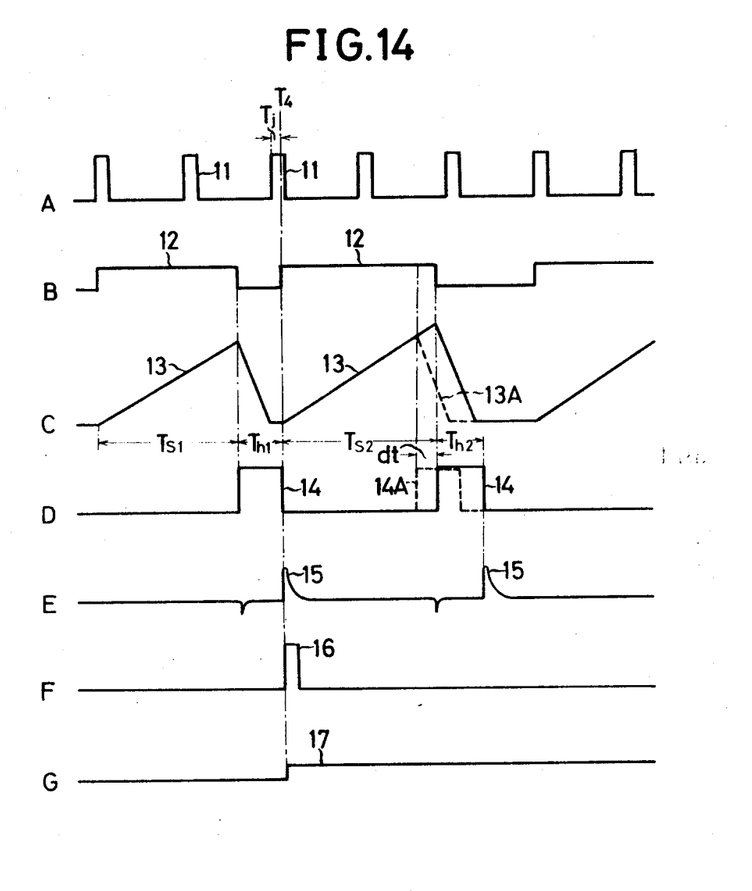
FIGS. 14A–14G are waveforms pertaining to a modification of FIG. 4.

The third embodiment of this invention will be described with reference to FIG. 12. This utilizes a differentiating circuit 5 as in FIG. 4 and only differs from FIG. 4 in that the AND circuit 6 takes its input from the gate circuit 2 instead of from the synchronising pulse generator 1.

Therefore, only when the differentiated pulse 15 and the gate signal 12 are applied to the AND circuit 6 at the same time, does the AND circuit 6 generate an output pulse 16 to increase the hold-off pulse duration.

A fourth embodiment will be desscribed with reference to FIG. 13. This is the same as FIG. 12 with the delay circuit 8 adding to delay the differentiated pulse 15 by a very short time $T_d$. For this reason, whether or not the gate signal 12 and the differentiated pulse 15 exist at the same time can more assuredly be known.

A fifth embodiment will be described with reference to FIGS. 14A–14G. The hold-off circuit 4 is generally made to generate the hold-off signal 14 when the sweep signal 13 reaches a predetermined level. However the control voltage generating circuit 7 of this embodiment controls the said level, so as to change the generating time of the hold-off signal 14. When jitter occurs, the hold-off signal 14 is not generated until the sweep signal 13 reaches a higher voltage level, as is quite apparent in FIGS. 14C and D. Thus the sweep time $T_{s2}$ is prolonged by the time $dt$. As the result, the end of the hold-off signal 14 is also delayed by the time $dt$, achieving the same result as in FIG. 4. In this embodiment, the sweep time $T_{s2}$ is made longer than $T_{s1}$ but control can also be effected to shorten the sweep time $T_{s2}$. In this embodiment, the pulse duration of the hold-off signal 14 is fixed, but it is also possible to change both the sweep time $T_s$ and the pulse duration of the hold-off signal 14.

Although the illustrative embodiments of this invention have been described in detail above with reference to the accompanying drawings, it is to be understood that this invention is not limited to these precise embodiments and that various changes and modifications may be effected theerein by one skilled in art without departing from the scope or spirit of the invention.

What is claimed is:

1. A sweep circuit comprising a synchronising pulse generator, a sweep signal generator, for generating a repetitive sweep signal followed by flyback thereof, a hold-off circuit and a first gating circuit, said first gating circuit being responsive to said synchronising pulse generator and to said hold-off circuit to trigger said sweep signal generator in response to the first synchronising pulse occurring after or at the end of a hold-off signal, said hold-off circuit operating in timed relationship with said sweep signal generator to provide a hold-off signal which ends after the flyback of the sweep signal.

and the improvement comprising first means for providing an output pulse when a synchronizing pulse is present simultaneously with the end of a hold-off signal, and second means responsive to an output pulse from said first means automatically to vary the duration of the interval between the instant at which the sweep signal is triggered and the instant at which the hold-off signal ends.

2. A sweep circuit according to claim 1, wherein said first means comprise a differentiating circuit for generating differentiated pulses off the ends of the hold-off signals, and a second gating circuit responsive to the simultaneous presence of a differentiated pulse and a synchronising pulse to generate an output pulse for application to said second means.

3. A sweep circuit according to claim 1, wherein said first means comprise a differentiating circuit for generating differentiated pulses off the ends of the hold-off signals, and a second gating circuit responsive to the simultaneous presence of a differentiated pulse and a signal derived from a synchronising pulse to generate an output pulse for application to said second means.

4. A sweep circuit according to claim 3, further comprising a delay circuit arranged to delay the differentiated pulses slightly.

5. A sweep circuit according to claim 3, wherein said second gating circuit is responsive to the differentiated pulses and the output from said first gating circuit.

6. A sweep circuit according to claim 1, wherein said first means comprise a delay circuit for delaying the hold-off signals to provide delayed signals, and a second gating circuit responsive to the simultaneous presence of a delayed signal and a synchronising pulse to generate an output pulse for application to said second means.

7. A sweep circuit according to claim 1, wherein said first means comprise a delay circuit for delaying the hold-off signals to provide delayed signals, and a second gating circuit responsive to the simultaneous presence of a delayed signal and a signal derived from a synchronising pulse to generate an output pulse for application to said second means.

8. A sweep circuit according to claim 7, wherein said second gating means is responsive to the delayed signals and the output from said first gating circuit.

9. A sweep circuit according to claim 1, wherein said second means change said predetermined level in re-in response to an output pulse from said first means.

10. A sweep circuit according to claim 1, wherein said second means increase the duration of the hold-off signal in response to an output pulse from said first means.

11. A sweep circuit according to claim 1, wherein said hold-off circuit generates a hold-off signal when the sweep signal reaches a predetermined level and wherein said second means change the duration of the hold-off signal sponse to an output pulse from said first means.

12. A sweep circuit according to claim 11, wherein said second means increase said predetermined level in response to an output pulse from said first means.

13. A sweep circuit according to claim 11, wherein the duration of said hold-off signal is fixed.

14. A sweep circuit according to claim 1, wherein said second means comprise a counting circuit for counting said output pulses from said first means and decoding means responsive to the counting circuit to provide a control voltage level for controlling the duration of said interval between the instant at which the sweep signal is triggered and the instant at which the hold-off signal ends.

References Cited
UNITED STATES PATENTS

| | | | |
|---|---|---|---|
| 3,408,580 | 10/1968 | Moryasu | 307—228 X |
| 3,502,902 | 3/1970 | Grein | 328—181 X |
| 3,122,652 | 2/1964 | Kobbe et al. | 307—228 |
| 3,339,088 | 8/1967 | Dillard | 328—185 X |
| 3,571,617 | 3/1971 | Hainz | 328—181 X |

STANLEY D. MILLER Jr., Primary Examiner

U.S. Cl. X.R.
328—181, 185